No. 611,072. Patented Sept. 20, 1898.
H. MILLER.
CAR REPLACER.
(Application filed May 19, 1898.)
(No Model.)
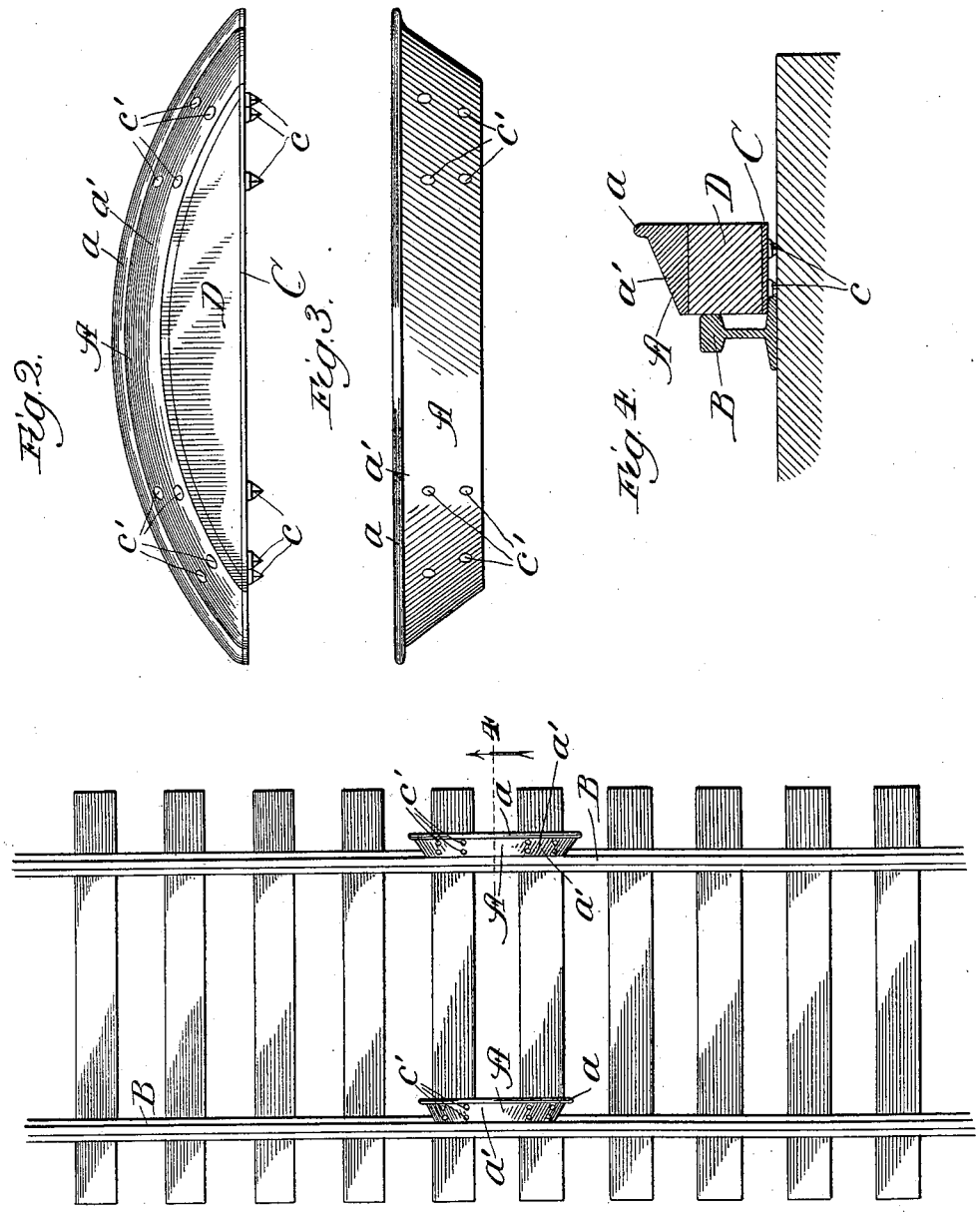

UNITED STATES PATENT OFFICE.

HENRY MILLER, OF HANNIBAL, MISSOURI.

CAR-REPLACER.

SPECIFICATION forming part of Letters Patent No. 611,072, dated September 20, 1898.

Application filed May 19, 1898. Serial No. 681,110. (No model.)

*To all whom it may concern:*

Be it known that I, HENRY MILLER, a citizen of the United States, residing at Hannibal, in the county of Marion and State of Missouri, have invented certain new and useful Improvements in Car-Replacers, of which the following is a specification.

My invention relates to that class of devices which are used for replacing the locomotive or railway car after it has been displaced through an accident or otherwise, and has for its object the providing of simple, economical, and efficient mechanism for replacing a car on the track.

The invention consists in the features, combinations, and details of construction hereinafter described and claimed.

In the accompanying drawings, Figure 1 is a plan view of a railroad, showing my improved car-replacer in connection therewith and in position for use; Fig. 2, a side elevation of one of the car-replacers in which my invention may be embodied; Fig. 3, a plan view of the car-coupler shown in Fig. 2, and Fig. 4, a cross-sectional view taken in line 4 of Fig. 1.

In the art to which this invention relates it is well known that there is considerable difficulty encountered in replacing the car on a railway-track once it has been removed therefrom, either by an accident or otherwise. It is also well known that there are many kinds of devices used for the purpose of replacing cars on tracks, all of which are more or less successful in operation. There are, however, numerous defects existing in these devices, due to the fact that there are some cases in which they are deficient and to the further fact that the first cost of construction is an item of considerable importance. My invention has for its object the removal of these objections and the providing of a simple and economical car-replacer made from material hitherto considered as waste and treated as scrap and having no commercial value whatever.

In constructing a replacer in accordance with my improvements I take a tire of a driving-wheel of a locomotive which has been discarded as scrap or waste and which has, relatively speaking, no commercial value. I turn down the flanged rim of this tire to about one-third of its actual height, so that it is merely what might be termed a "guiding-flange." I next cut this tire into arcs of circles, so that when the chord is drawn from one free end of the arc to the other it forms a segment of a circle. This segment or arc of a circle is indicated by the letter A in the accompanying drawings and is provided with a flanged lateral edge $a$, so cut and arranged that its upper or peripheral surface $a'$ is at an incline. This inclined surface can be obtained by cutting the tire at an angle to the axis of the wheel or by dressing down the tread, as seems most economical. It is possible to use this segment of a circle alone and independent of other mechanisms for the purpose of replacing the car on the track by merely placing its free edge, or the edge unprovided with a flange close or adjacent to the rail B of a railroad-track, one on the outside, as shown in Fig. 1, and the other on the inside of the opposite track, as shown in the same figure. One of these replacers should be higher than the other, for the reason that, as shown in Fig. 4 of the drawings, it must lift the flanged rim of the car-wheel above the track-head, so that it may slip down on the inside thereof. The other replacer should be of such a height as merely necessary to bring the tread of the wheel as high as the head of the track-rail.

For the purposes of safety and in order to give additional strength to the replacer I prefer to provide it with what I term a "base-plate" C, which represents the chord of a structure and which ties the free ends together. This base-plate is provided with a number of spikes $c$, adapted to be pressed into the sleepers or rail-ties and assist in holding the replacer in place.

In order to give additional strength to the device, I provide a filling D, of wood, and insert it between the upper part of the replacer and the base-plate, which is held in place by having the shank of the spike $c'$ extend clear through the base-plate, filler, and replacer-rim.

The advantages incident to a replacer constructed in accordance with my improvements are, first, that it is very economical to manufacture, being formed of material hitherto considered as waste, treated as scrap, and which has, relatively speaking, no commercial value. This is an important advantage, for the reason that in small things, especially where there are a great many of them, the cost of material is practically the only thing considered, as the element of labor is but a very small factor in the cost of production. Second, the replacer, in view of the fact that it is in the form of a segment of a circle provided with a flange at the outer end, is very economical and efficient in operation, and, finally, the article is easy to carry on a locomotive, railway, or other car.

I claim—

1. As a new article of manufacture, a car-replacer consisting of an arc-shaped portion of the flanged rim of a locomotive-wheel tire, less than a semicircle, substantially as described.

2. As a new article of manufacture, a car-replacer consisting of an arc-shaped portion of the flanged rim of a locomotive-wheel tire, less than a semicircle, a metal base-plate or chord connecting the free ends of the replacer together, a filling of wood interposed between the base-plate and arc-shaped portion, and spikes inserted in the base-plate to assist in holding the replacer in position, substantially as described.

3. As a new article of manufacture, a car-replacer formed of a section of a locomotive-wheel tire having a small flanged rim at one peripheral edge thereof, a base-plate provided with spikes connecting the free ends of the segment together, and a filling of wood or similar material interposed between the rim and the base-plate, substantially as described.

HENRY MILLER.

Witnesses:
THOMAS F. SHERIDAN,
THOMAS B. MCGREGOR.